April 26, 1932. R. L. DOOLITTLE ET AL 1,855,386
CONTROL VALVE
Filed June 5, 1930 2 Sheets-Sheet 1
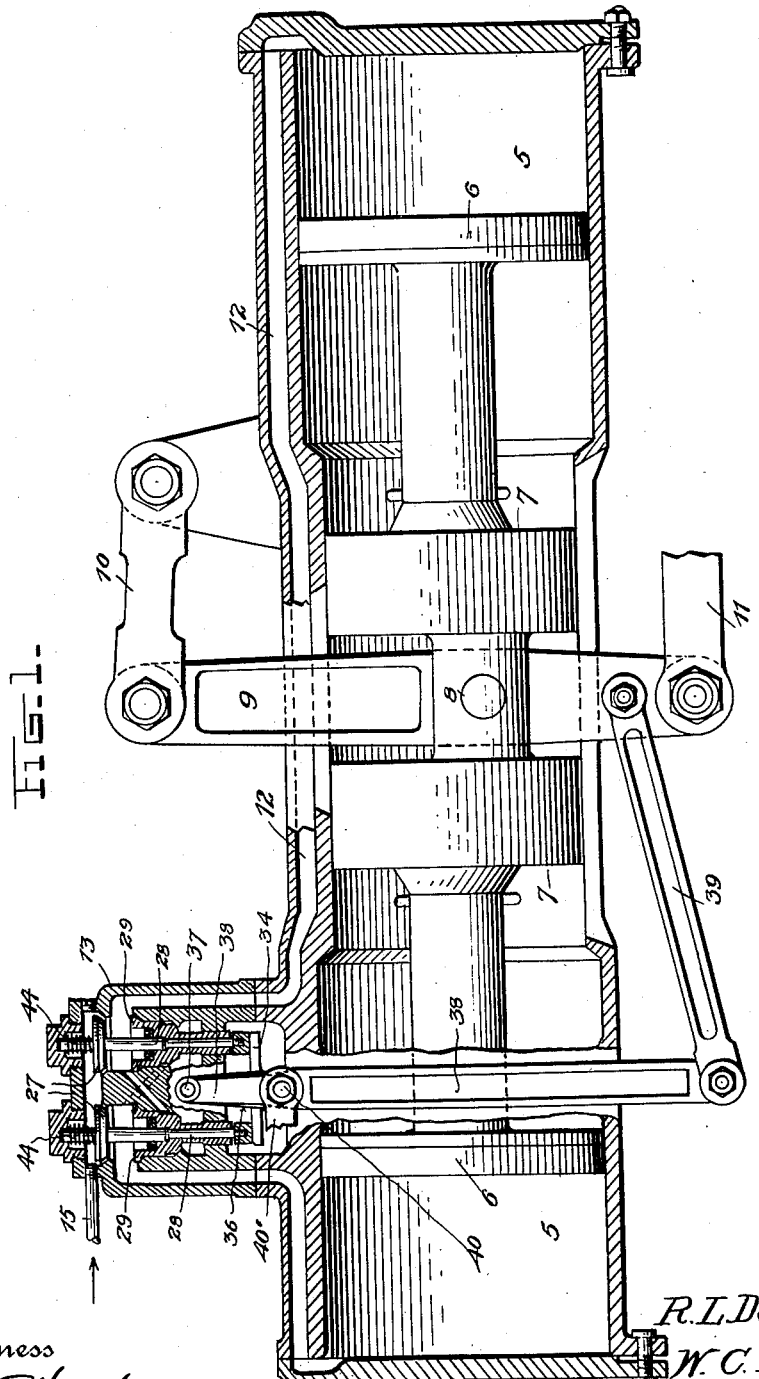
Inventors
R. L. Doolittle
W. C. Hunter

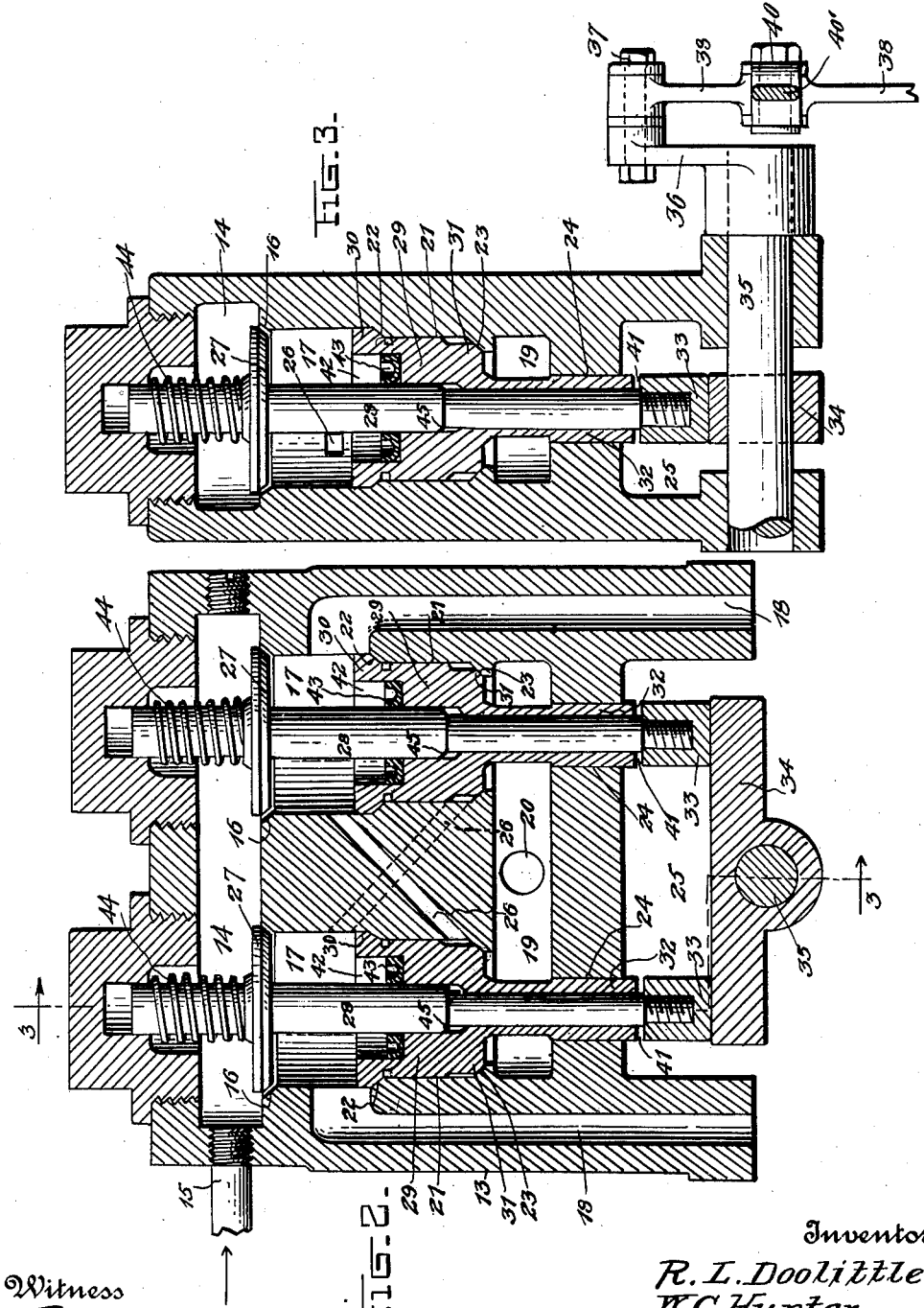

Patented Apr. 26, 1932

1,855,386

UNITED STATES PATENT OFFICE

ROBERT L. DOOLITTLE AND WILLIAM C. HUNTER, OF MONTGOMERY, ALABAMA

CONTROL VALVE

Application filed June 5, 1930. Serial No. 459,386.

The invention relates to a control valve intended primarily for use with cylinder and piston assemblies used as operators for reverse gears on locomotives, in which respect the invention is analogous to that disclosed in our U. S. Patent 1,595,458.

It is the primary object of the present invention to provide an improved construction in which "pumping" of the pistons of the cylinder and piston assembly is effectively prevented, in which there is no intermittent "spitting" of the exhaust, and in which exhaust of compressed air or other operating fluid from either end of the cylinder and piston assembly, will not be resisted by any pressure flowing through bleed ports or the like.

In carrying out the above end, the air admission valves are normally held off their seats a trifle, admitting fluid pressure to both ends of the cylinder and piston assembly to maintain the piston or pistons thereof substantially in the positions to which last moved, and these valves are related in a novel manner with the exhaust valves so that either admission valve may close completely and the other open to a predetermined extent from its normal position without opening either of said exhaust valves. Thus, when the control valve is operatively connected with the piston or pistons of the cylinder and piston assembly or with a part of the reversing gear in a known manner, whereby any creeping of the gear will operate the valve, it is insured that this valve shall rectify such creeping without opening either of the exhaust valves and causing "spitting" with consequent annoyance and waste of air or other fluid pressure.

The two valves (admission and exhaust) are slidably connected with each other and a further object of the invention is to provide unique packing means for preventing leakage of pressure through the opening in one valve through which the stem of the other valve passes slidably.

A still further aim is to provide an exhaust valve provided with two valve portions cooperating with two individual seats in a manner to prevent leakage which might otherwise occur.

With the foregoing and minor objects in view, the invention resides in the novel subject matter hereinafter described and claimed, description being accomplished by reference to the accompanying drawings.

Fig. 1 is a side elevation partly broken away and in section showing the valve operatively connected with a piston and cylinder assembly.

Fig. 2 is an enlarged vertical sectional view through the valve.

Fig. 3 is a vertical transverse sectional view on line 3—3 of Fig. 2.

The valve is shown in connection with a cylinder and piston assembly embodying two opposed cylinders 5, two pistons 6 slidable in said cylinders, and a cross-head 7 connected with the pistons. Pivotally connected at 8 with the cross-head 7, is a lever 9 which is fulcrumed to an anchoring link 10. The end of this lever 9 remote from its fulcrum, is pivoted to a link 11 which leads to and is appropriately connected with the reversing shaft of a locomotive. Fluid-conducting ports 12 lead to the ends of the cylinders 5 and by means of the control valve constituting this invention, fluid under pressure may be directed through one of these ports and exhausted from the other, thus effecting shifting of the pistons 6 and the cross-head 7, to swing the lever 9 and actuate the link 11, thereby operating the reverse gear.

The control valve embodies a casing or body 13 suitably mounted upon one of the cylinders 5 or upon any other appropriate supporting means. In the upper portion of this body 13, is a reservoir chamber 14 having a fluid inlet 15. Formed in the bottom of this chamber are two valve seats 16 which extend around the rims of two fluid pressure receiving chambers 17. From these chambers, fluid-conducting ports 18 lead to the ports 12 above described. Formed in body 13 below the chambers 17, is an exhaust pressure receiving chamber 19 from which an exhaust passage 20 extends to the atmosphere. Two vertical bores 21 extend from the chambers 17 to the chamber 19, the upper ends of said bores being provided with upwardly facing valve seats 22 while the lower ends of said bores are provided with similarly facing seats 23. Additional bores 24 in axial alinement with the bores 21, extend from the chamber 19 into a recess 25 in the lower end of the body 13. Two exhaust ports 26 are formed in the body 13 between the two bores 21. At their upper ends, these ports 26 communicate with the chambers 17 while at their lower ends, they communicate with the lower portions of the bores 21, said ports being crossed as shown.

Fluid-admission valves 27 are provided for co-action with the seats 16, said valves having downwardly projecting stems 28 which extend into the recess 25. Slidably surrounding these stems 28 and received in the bores 21 are two exhaust valves 29. These exhaust valves are provided with upper valve portions 30 co-acting with the seats 22 and with lower valve portions 31 co-operating with the seats 23. The upper valve parts 30 and seats 22 prevent any leakage of fluid from the chambers 17 into the bores 21, and the lower valve portions 31 and seats 23, prevent communication when not desired, between said bores 21 and the chamber 19. The valves 29 are provided with comparatively short tubular stems 32 which slidably surround the stems 28 and extend through the openings 24 into the recess 25.

Caps or the like 33 are threaded upon the lower ends of the stems 28 and these caps are normally spaced a slight distance below the lower ends of the stems 32, said caps normally resting upon opposite ends of a rocker 34 which is disposed within the recess 25. Rocker 34 is carried by a shaft 35, said shaft having a crank arm 36 at one end. This crank arm is pivoted at 37 to the upper end of a lever 38, the lower end of this lever being connected by a link 39 with the lever 9. The shaft 35 may be initially rocked in either direction by shifting the fulcrum 40 of the lever 38 in a manner constituting no part of the present invention, a part of the shifting means being represented at 40'. When such shaft rocking has been accomplished, it operates the control valve to supply fluid under pressure to one cylinder 5 and to exhaust fluid from the other cylinder 5, thereby allowing shifting of the pistons 7 and cross-head 8 to operate the parts 9 and 11 and actuate the reverse gear. After such reverse gear shifting has taken place, the fulcrum 40 of lever 38 is again shifted so that the rocker 34 occupies its neutral position, and the parts are allowed to here stand until another movement of the reverse gear is required. When the rocker 34 is in this neutral or normal position, both of the caps 33 rest upon said rocker as seen in Fig. 2, and these caps so support the valve stems 28 that both air admission valves 27 are held slightly off of their seats 16. Consequently, pressure from the reservoir chamber 14 enters both chambers 17 and flows from them through the ports 18 and 12 into both of the cylinders 5. Consequently, the pressure is equalized upon both of the pistons 6 and they should remain stationary. When both caps 33 rest upon the rocker 34, both exhaust valves 29 are closed as seen in Fig. 2 and gaps 41 of about one thirty-second of an inch exists between the upper ends of said caps and the lower ends of the exhaust valve stems 32. If the pistons should creep slightly in one direction or the other, the operating connections 39, 38 and 36 turn the rock shaft 35, thus moving one of the admission valves 27 in a closing direction and further opening the other, with the result that sufficient excess pressure is supplied to one end of the cylinder and piston assembly to restore the pistons to their previous positions. Such restoration will take place without either cap 33 coming in contact with the adjacent exhaust valve stem 32 and consequently without opening either exhaust valve 29. Hence, there is no loss of pressure at the exhaust of the valve and no undesirable "spitting" at said exhaust.

As soon as rocker 34 is rocked sufficiently by hand, it frees one of the caps 33 with the result that the valve 27 immediately above this cap, then closes. Simultaneously with such freeing of the one cap 33, the other cap 33 is raised, thus raising the other valve 27 and due to striking of the cap 33 against the superposed exhaust valve stem 32, opening the exhaust valve 29 connected with this stem. Consequently, while fluid under pressure is being supplied to one end of the piston and cylinder assembly by way of the chambers, ducts or the like 14, 17, 18 and 12, exhaust is taking place from the other end of said assembly through the corresponding ducts, passages, chambers, etc. 12, 18, 17, 26, 21, 19 and 20.

In order to prevent leakage through the exhaust valves 29, around the stems 28, the upper ends of said valves are provided with cylindrical recesses 42 whose side walls are concentric with and spaced outwardly from said stems. Packing rings 43 of U-shape in transverse section, are snugly seated in the recesses 42, their outer edges being in fluid-tight contact with the walls of said recesses, while their inner edges similarly contact with the stems 28. The pressure from the chambers 17, holds the packing rings 43 seated, establishing a fluid-tight seal between the stems 28 and the exhaust valves 29.

Coil springs 44 are preferably provided to impart closing movement to the valves 27 and their stems 28 and these stems are preferably provided with shoulders 45 to abut portions of the exhaust valves 29 to start the latter toward closed position when open. The valves 29 however are held seated by the pressure in the chambers 17.

It will be seen from the above that novel and advantageous provision has been made for carrying out the objects of the invention. Particular attention is invited to the fact that the admission valves 27 are normally open a trifle to equalize the pressure in opposite ends of the cylinder and piston assembly, thereby tending to hold the piston or pistons in the position to which last adjusted. However, should said piston or pistons start to creep in one direction or the other, the admission valves are immediately operated in reverse directions to supply unequal pressure to the two ends of the cylinder and piston assembly, thereby promptly returning the piston or pistons to the position from which the creeping has taken place. Such movements of the admission valves do not move the exhaust valves 29 from their seats due to the gaps 41 between the caps 33 and the stems 32. Whenever manual adjustment of the valves is to be made however, turning of the rockers 34 causes one or the other of the caps 33 to pick up the superposed stem 32, so that one exhaust and one admission valve will be opened, the other exhaust valve then remaining closed and the other admission valve moving to closed position from its normal partly open position. By this closing of the last mentioned admission valve 27, there can be no flow of pressure toward the end of the cylinder and piston assembly which is exhausting. Consequently, the exhaust of fluid from said end will not be resisted, and moreover there will be no waste of compressed air or other fluid used in operation of the reverse gear.

While the invention is primarily intended for operating a reverse gear, it is to be understood that it is not restricted to this particular field of use but may be employed wherever of advantage.

What is claimed is:—

1. In a control valve, two fluid admission valves for opposite ends of a cylinder and piston assembly, said admission valves each having a carrying stem, two normally closed exhaust valves for said assembly ends, said exhaust valves slidably surrounding said admission valve stems, operating means for said valves normally abutting the stems of both admission valves and holding the latter open a trifle to equalize pressure in opposite ends of the cylinder and piston assembly, said operating means being operative to successively effect complete closing of either admission valve and opening of the other admission valve, and means for opening either exhaust valve upon predetermined opening of the admission valve engaged therewith.

2. In a control valve, two fluid admission valves for opposite ends of a cylinder and piston assembly, said admission valves each having a relatively long stem, two normally closed exhaust valves for said assembly ends, said exhaust valves slidably surrounding said admission valve stems and having relatively short tubular stems, and valve operating means co-operable with said stems and active to normally hold said admission valves open a trifle, said operating means embodying pick-up means for opening either exhaust valve only after predetermined opening of the associated admission valve from its normal position.

3. A structure as specified in claim 2; said pick-up means comprising a shoulder on each admission valve stem to abut the tubular stem of the associated exhaust valve.

In testimony whereof we affix our signatures.

ROBERT L. DOOLITTLE.
WILLIAM C. HUNTER.